Figure 1:
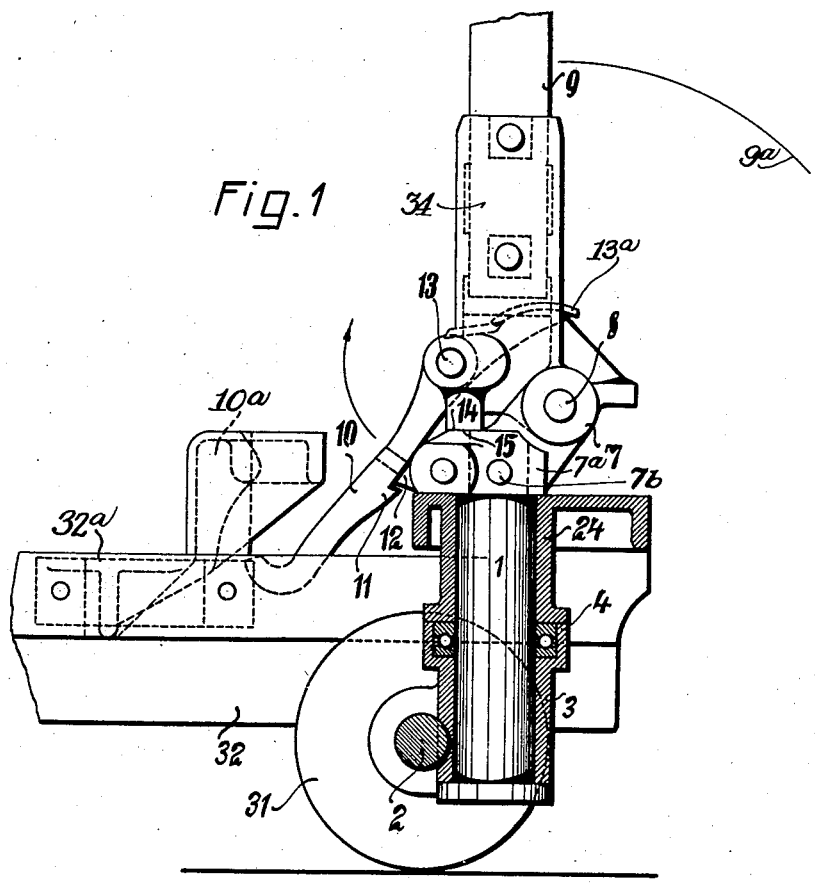

Nov. 23, 1937.  J. LOEF  2,100,194
LIFTING TRUCK
Original Filed June 6, 1931   3 Sheets-Sheet 1

INVENTOR.
Jakob Loef
By
William C. Linton
Attorney.

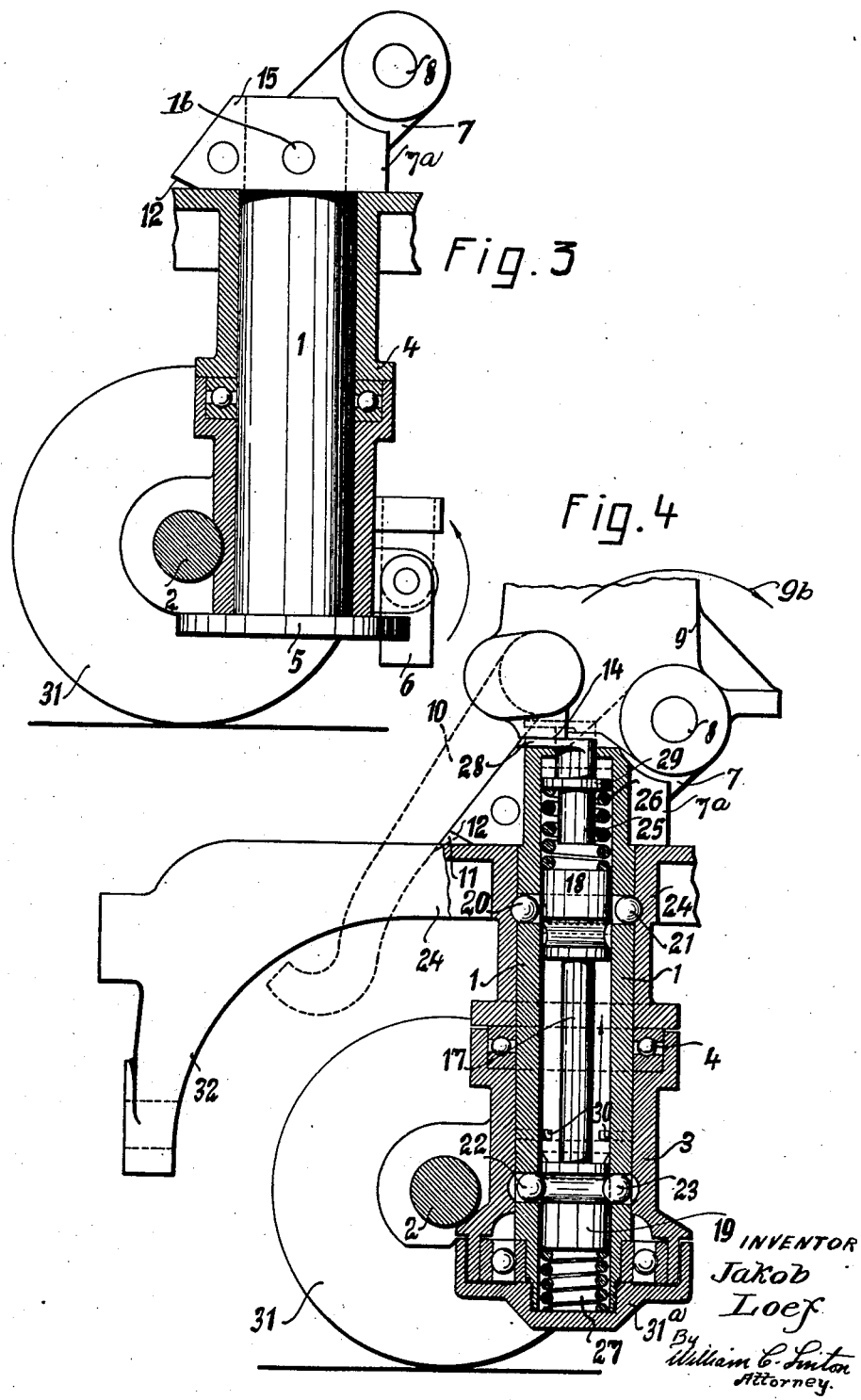

Nov. 23, 1937. J. LOEF 2,100,194
LIFTING TRUCK
Original Filed June 6, 1931   3 Sheets—Sheet 3
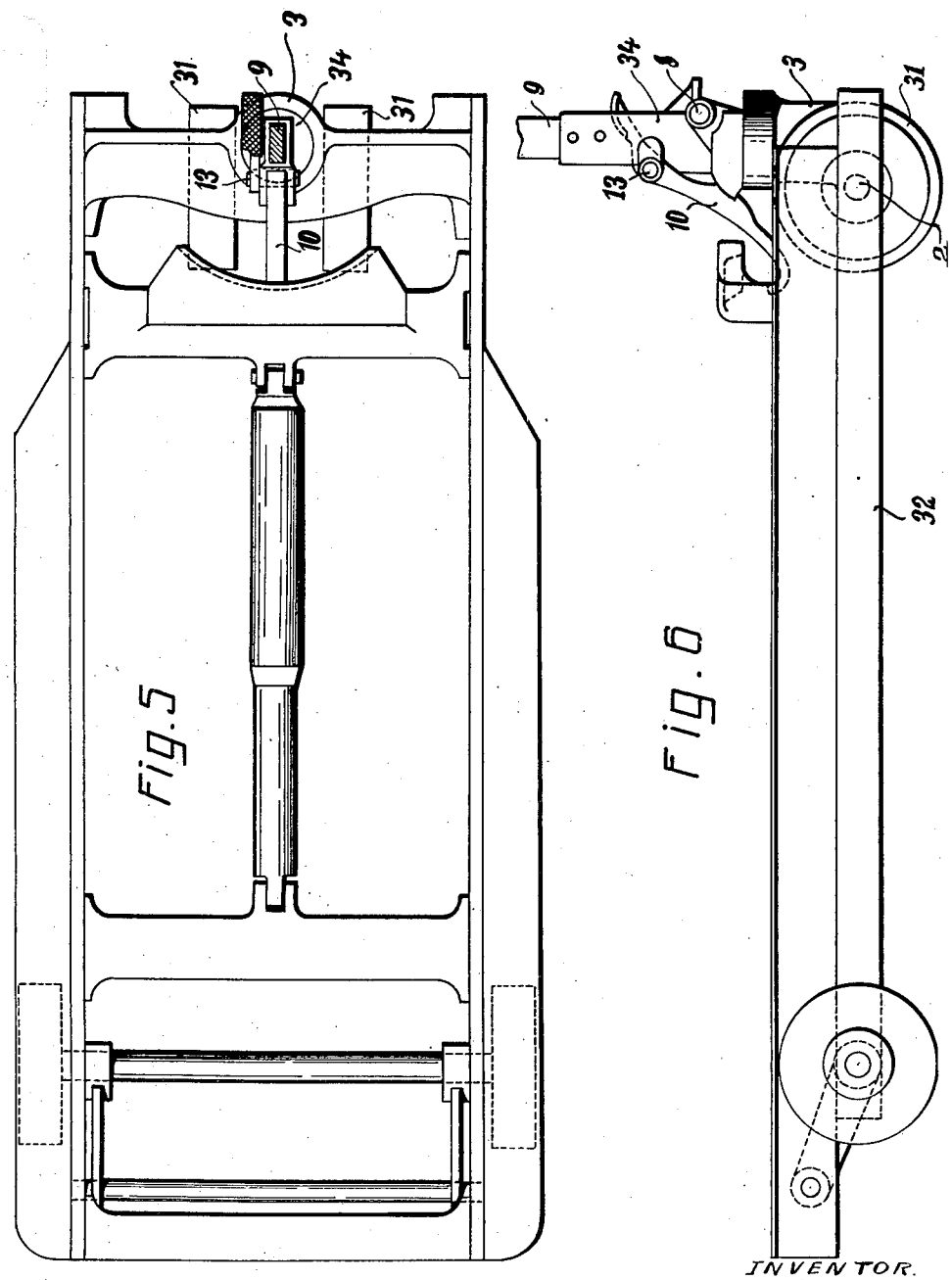
INVENTOR.
Jakob Loef
By William C. Linton
Attorney.

Patented Nov. 23, 1937

2,100,194

UNITED STATES PATENT OFFICE 2,100,194

LIFTING-TRUCK

Jakob Loef, Moosburg, Germany

Application June 6, 1931, Serial No. 542,683. Renewed May 25, 1935. In Germany June 10, 1930

14 Claims. (Cl. 280—48)

This invention relates to lifting trucks of the type in which an elevating platform is placed in contact with a skid and elevates that skid and the load placed thereon. Trucks of this type generally utilize two forms of front end mechanisms. One form embodies a pair of steering wheels secured to a steering king pin mounted in a steering head on the main frame, the steering king pin having secured at its upper end a steering assembly including a pivoted steering and lifting lever. The steering lever is adapted to rotate the king pin and steer the truck.

In the other form of lifting truck, a lifting and manipulating handle is utilized at the front end, but this handle is not connected with the front wheels. The wheels are in the form of casters and are mounted for pivoting on a fixed offset axis, the pivoting movement being obtained by the application of turning effort to the lift truck itself, as is well known to those skilled in the art.

Each of the two forms of truck described has certain advantages. The steering truck is especially effective where heavy loads are lifted and moved, since it allows for the application of considerable pulling effort and facilitates steering. The caster type of truck is preferred for lighter load and in places where the truck must be manipulated in confined spaces and make sharp angular turns.

It is readily conceivable that a truck which might be adapted for caster steering, or for steering lever direct steering at the will of the user, would be of considerable value. My invention contributes to the art a lifting truck which may be steered by a steering lever or may be steered through the caster mounting of its front wheels.

My truck is especially valuable because it combines the two types of trucks without requiring a compromise construction. Therefore, when the truck is operating under one of its methods of operation, it is just as effective as though it had been constructed especially for that method of operation. It is this feature of the construction of my truck which is of especial importance in the consideration of the contribution I have made to the art.

Additional features which are inherent in the preferred embodiment of my invention are means whereby the front steering wheels are connected to the steering mechanism for movement by that steering mechanism or are disconnected from the steering wheels for caster movement, upon the positioning of the steering lever in a predetermined position, the transforming of the truck being entirely automatic. Since also in trucks of this type, it is required that this change take place only when the steering wheels, or the steering mechanism are in a predetermined position, I utilize spring mechanism which is placed under tension for making the transformation, and which spring mechanism is effective as soon as the truck steering wheels or steering mechanism are in a predetermined neutral position.

An additional feature of the truck embodies the mounting of the steering wheel assembly so that it rotates on the axis of the king pin and is in thrust bearing relation to the steering head of the truck. Still a further feature of the invention resides in the design of the steering or lifting mechanism whereby when the lifting lever is placed in a vertical position, it is locked in that vertical position by a portion of the lifting mechanism, this portion being preferably the lifting hook.

While in the specification which follows I have described certain preferred modifications of my invention, it should be understood that my contribution to the art is relatively broad and I feel myself entitled to broad claims and a broad interpretation of those claims.

Figure 2:
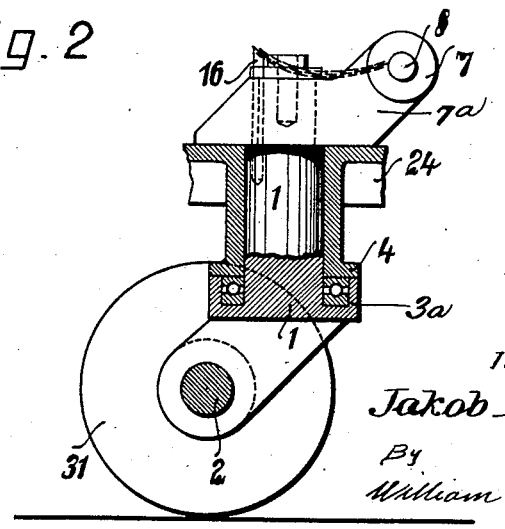

I shall now describe the drawings in which Fig. 1 is a partial section of a lift truck of the type shown in the Stuebing patent, No. 1,750,289, issued March 11, 1930, showing a form of my invention applied thereto. Fig. 2 illustrates a form of means for locking the steering assembly to the steering king pin. Fig. 3 is a modification of my invention showing the locking of the steering wheel assembly to the steering king pin. Fig. 4 is a further modification of my invention showing the preferred mechanism which I have designed for automatically converting the truck from a steering type to a caster type at the will of the operator. Figs. 5 and 6 are respectively plan and side views of a truck of the type illustrated in the Stuebing patent and to which my invention is applied.

Referring now to Fig. 1, my truck embodies a main frame 32 having a steering head 24 in which is mounted a king pin 1 forming the axis about which the steering wheels 31 are mounted for rotation. Steering wheels 31 are supported by an axle 2 carried in turn by a wheel assembly member 3 which is mounted about the axis of the king pin 1 and preferably on king pin 1 itself, and is connected by thrust bearings 4 with the steering head 24. A collar 7a is secured to the upper end of king pin 1 through means of a pin 7b, this collar having an extension 7 to which the supporting socket 34 of the steering and lifting lever 9 is pivoted at 8.

It will be readily appreciated that in the construction just described, the steering wheels 31, which are offset relatively to the axis about which they may rotate, act like caster wheels as this truck is pulled about through the medium of the lever 9. In a truck of the type just described, it is especially desirable that the truck be designed so that it may be manipulated when the lever 9 is in a vertical position, such as illustrated in Fig. 1. It is therefore necessary to provide means to secure the lever 9 in a vertical position against downward swinging movement and against rearward movement.

To provide such means, I utilize a special construction of the usual type of lifting hook 10 pivoted to the socket member 34 at 13 and provided with a foot pedal portion 13a. This construction of the lifting hook is a usual one and is illustrated in the Stuebing patent already referred to. I have a detent portion 11 on the hook member 10, which portion cooperates with a lug 12 on the collar member 7a and prevents downward swinging movement of the hook 10 with the lever member, as is easily understood. To prevent movement in a reverse direction of the lever member, I utilize a stop 14 on the member 34 cooperable with a stop 15 on the collar 7a. When it is desired to elevate the truck, pressure on the pedal 13a will separate detent 11 from lug 12 and will cause hook 10 to engage member 10a on the elevating platform 32a so that thereafter downward swinging movement of the lever 9 in the direction of the arrow 9a will elevate the platform, as will be quite clearly seen.

Referring now to Fig. 3, I show a modification of the truck of Fig. 1 in which the construction is substantially the same except that the king pin 1 has a disc 5 at its lower end cooperable with a pivoted tongue 6 carried on the wheel assembly 3. Disc 5 has slots formed in its periphery and preferably placed 90 degrees apart, one slot cooperating with the tongue 6 when the steering wheels 31 are in a straight ahead position and the other slot cooperating with the tongue when the steering wheels are at a 90 degree angle from a straight ahead position. The steering wheels may be locked to the king pin 1 in their straight ahead position, thus forming a steering type of truck. On the other hand, they may be locked at 90 degrees from their straight ahead position when it is desired to maintain the truck against movement, as in freight cars, on steep grades, etc.

Referring now to Fig. 2, I show a modification of my truck in which the collar 7a supporting the steering lever 9 is mounted for free rotation about the king pin 1 but in which the wheel assembly 3 is integral with the king pin 1. Whenever it is desired in this type of truck to transform it to a steering type of truck, it is merely necessary to operate a pin 16 which will immediately connect the collar 7a to the king pin 1 for integral movement with that king pin.

Referring now to Fig. 4, I illustrate a truck in which the front end may be converted from a steering type of truck to a caster type and vice versa at the will of the operator and preferably when the operator places the lifting lever in a vertical position and when he moves it into a substantially horizontal pulling position. Of course other positions may possibly be used, and means separate from the steering lever could be substituted for operating the change over mechanism if desired. In this type of truck, the king pin 1 is preferably hollow. Mounted in this hollow king pin is a piston rod 17 having an upper piston portion 18 and a lower piston portion 19. The pistons 18 and 19 each cooperate with two balls, portion 18 with balls 20 and 21 and portion 19 with balls 22 and 23.

When the piston is in the position of Fig. 4, the balls 22 and 23 are allowed to enter a chamfered groove in the piston 19 and leave corresponding chamfered portions in the wheel assembly 3. Thus, the wheel assembly 3 is rendered freely rotatable about the hollow king pin 1. On the other hand, the unchamfered portion of the piston 18 is opposite the balls 20 and 21 so that those balls are forced into chamfered portions in the steering head 24 and will definitely secure the king pin 1 against rotation relatively to the steering head 24. Therefore, in the construction of the parts in Fig. 4, the king pin 1 will be secured against rotation in the steering head 24, and the steering wheel assembly 3 will be freely rotatable in the manner of a caster about the axis of king pin 1. It should be indicated that the king pin is utilized, preferably, as the connecting link between the steering assembly and wheel assembly, but that other arrangements might be made whereby the steering assembly itself could be locked rather than the king pin, and through it, the steering assembly.

Should the piston rod 17 and pistons 18 and 19 be moved upwardly into a position where the chamfered groove of piston 18 is opposite balls 20 and 21, it is readily seen that the balls 20 and 21 would move out of locking engagement with the steering head 24 and that the king pin 1 would then become freely rotatable in the steering head 24. At the same time, piston 19 would move so that its unchamfered portion would come opposite the balls 22 and 23, forcing those balls into locking engagement with the chamfered portion of the wheel assembly 3, so as to secure the king pin 1 for integral rotation with that wheel assembly. In this position of the parts, we would have a full steering type of truck.

To obtain this movement of the piston rod 17 and the pistons 18 and 19, I prefer to utilize the steering lever 9. Also, while utilizing the steering lever 9, I desire to employ spring pressure operation of the piston rod 17 in order that it shall be possible to place the piston rod 17 under pressure to operate the pistons 18 and 19, even though the relation of the king pin or the wheel assembly is such that the balls 20, 21, 22 and 23 are not in a position to enter the chamfered or unchamfered portions of the assembly.

It will be readily appreciated that if the pistons are directly operable by lever 9, it will be necessary always to properly align the steering mechanism before the rod 17 may be operated. By employing spring pressure mechanism, I may place the piston rod 17 under pressure so that it will operate as soon as the steering mechanism is properly aligned to permit the operation of the balls.

For accomplishing the results thus generally indicated, I utilize a pin 25 protruding upwardly through king pin 1 and separated from the piston 18 by a relatively strong spring 26, operating against a disk portion 29 of the pin 25. At the upper end of the pin 25 I have a flat portion 28 cooperating with the stop surface 14 of the lever 9 so that if lever 9 assumes the position of Fig. 4, it places the spring 26 under tension and thus puts the piston assembly 17 under pressure so that it will move into its lower position illustrated in Fig. 4 as soon as the steering assembly is positioned so that the balls 20 and 21 may enter into the chamfered portions in steering head 24. As soon as lever 9 is swung in the direction of the arrow 9b in Fig. 4, the pressure on spring 26 will be relieved and the spring 27 maintained against the lower end of piston 19 by a cap member 31a, comes into action. This spring 27 will act to push the piston rod 17 and pistons 18 and 19 upwardly so as to transform the truck into a steering type immediately upon the downward swinging of the lever 9.

Having now particularly described my invention, what I claim is:

1. In a truck of the class described, a steering head, a king pin in said head, a steering assembly including a pivoted steering lever adapted to impart steering movement to said king pin, said lever being movable from a vertical position to a substantially horizontal position relatively to said steering head, a wheel assembly mounted for rotation on the axis of said king pin and relatively to or in locked relation to said steering assembly, and means actuated by said lever when in an upright position to release said wheel assembly for free rotation relatively to said steering assembly.

2. In a truck of the class described, a steering head, a king pin in said head, a steering assembly including a pivoted steering lever adapted to impart steering movement to said king pin, said lever being movable from a vertical position to a substantially horizontal position relatively to said steering head, a wheel assembly mounted for rotation on the axis of said king pin, means for locking said wheel assembly for integral rotation with said steering assembly, and means actuated by said lever when in an upright position to release said wheel assembly for free rotation relatively to said steering assembly.

3. In a truck of the class described, a steering head, a steering assembly including a steering lever, a steering wheel assembly mounted for steering rotation, means for locking said wheel assembly to said steering assembly and for releasing said wheel assembly from said steering assembly, said means being operable by said steering lever when the same is placed in predetermined positions.

4. In a truck of the class described, a steering head, a steering assembly including a pivoted steering lever, said lever being movable from a vertical position to a substantially horizontal position relatively to said steering head, a wheel assembly mounted for rotation, means for locking said wheel assembly for integral rotation with said steering assembly, means actuated by said lever when in an upright position to release said wheel assembly for free rotation relatively to said steering assembly, and means for actuating said wheel assembly locking means to lock the wheel assembly to the steering assembly when said lever is moved from its upright position.

5. In a truck of the class described, a steering head, a king pin in said head, a steering assembly including a pivoted steering lever adapted to impart steering movement to said king pin, said lever being movable from a vertical position to a substantially horizontal position relatively to said steering head, a wheel assembly mounted for steering rotation on the axis of said king pin, means for locking said wheel assembly for integral rotation with said steering assembly, means actuated by said lever when in an upright position to release said wheel assembly for free rotation relatively to said steering assembly, and means for actuating said wheel assembly locking means to lock the wheel assembly to the steering assembly when said lever is moved from its upright position.

6. In a truck of the class described, a steering head, a king pin in said head, a wheel assembly mounted for rotation on the axis of said king pin, means for locking said king pin against rotation relatively to said steering head, means for locking said wheel assembly against rotation relatively to said king pin, and means adapted to actuate said king pin locking means to lock said pin to said head while releasing said wheel assembly for free rotation relatively to said king pin, said means being operable also to actuate said king pin locking means to release said king pin from said steering head and to actuate said wheel assembly locking means to lock said wheel assembly to said king pin.

7. In a truck of the class described, a steering head, a steering assembly on said head including a king pin and steering lever mounted for rotation on the axis of said king pin, a wheel assembly mounted for rotation on the axis of said king pin, means for locking said wheel assembly against rotation relatively to said steering assembly, means for locking said steering assembly against rotation relatively to said steering head, and means adapted to actuate said wheel assembly locking means to lock the same relatively to said steering assembly while simultaneously actuating said steering assembly locking means to release the same relatively to said steering head, said means being operable oppositely so as to actuate said wheel assembly locking means to release said wheel assembly from said steering assembly while actuating the steering assembly locking means to lock said assembly to the steering head.

8. In the combination of claim 6, said locking means being operable only when said wheel assembly and king pin are in predetermined aligned position, and a spring interposed between said locking means and the means for actuating the locking means and placed under tension by the said actuating means until such time as the wheel assembly and king pin are in said predetermined aligned position, whereupon the spring acts to actuate said locking means.

9. In the combination of claim 7, said locking means being operable only when said wheel assembly and said steering assembly are in predetermined aligned position, and a spring interposed between said locking means and the means for actuating the locking means and placed under tension by the said actuating means until such time as the wheel assembly and the steering assembly are in said predetermined aligned position, whereupon the spring acts to actuate said locking means.

10. In a lifting truck of the character described, a frame, a steering head integral with said frame, a king pin journaled in said steering head, a steering lever connected to said pin and horizontally swingable on the axis of said pin, a wheel assembly journaled on said pin and adapted to rotate freely thereon, means for coupling said wheel assembly and lever, and means for coupling said lever and steering head while simultaneously releasing the coupling between said wheel assembly and lever.

11. In a lifting truck of the character described, a frame, a steering head rigid with said frame, a hollow king pin rotatably received in said head, a steering lever pivotally connected to the upper portion of said pin for placement in an up or down position and horizontally swingable with the latter for steering the truck, a wheel assembly mounted on the lower portion of said pin for free rotation thereon, and means within said hollow king pin acted upon by actuation of said lever to relatively lock or release said wheel assembly and king pin to or from the frame dependent upon the position of said handle.

12. In a lifting truck of the character described, a frame, a steering head rigid with said frame, a hollow king pin rotatably received in said head, a steering lever pivotally connected to the upper portion of said pin for placement in an up or down position and horizontally swingable with the latter for steering the truck, a wheel assembly received upon the lower portion of said pin for free rotation thereon, a piston mounted to reciprocate within said hollow king pin with the up or down movement of said handle, and means between said piston, steering head and wheel assembly to relatively lock or release the same dependent upon the position of said lever.

13. In a lifting truck of the character described, a frame, a steering head rigid with said frame, a hollow king pin rotatably received in said head, a steering lever pivotally connected to the upper portion of said pin for placement in an up or down position and horizontally swingable with the latter for steering the truck, a wheel assembly received upon the lower portion of said pin for free rotation thereon, a piston mounted to reciprocate within said hollow king pin with the up or down movement of said handle, means between said piston, steering head and wheel assembly to relatively lock or release the same dependent upon the position of said handle, and spring means cooperating with said piston to control the operation thereof.

14. In a lifting truck of the character described, a frame, a steering head rigid with said frame, a hollow king pin rotatably received in said head, a steering lever pivotally connected to the upper portion of said pin for placement in an up or down position and horizontally swingable with the latter for steering the truck, a wheel assembly received upon the lower portion of said pin for free rotation thereon, means within said hollow king pin and acted upon by actuation of said handle to relatively lock or release said wheel assembly and king pin to or from the steering head and each other dependent upon the position of the lever, and means associated with said lever and operable when the latter is in its up position for retaining the same in such position.

JAKOB LOEF.